(12) United States Patent
Roy-Mayhew et al.

(10) Patent No.: US 11,866,374 B2
(45) Date of Patent: Jan. 9, 2024

(54) FLEXIBLE FEEDSTOCK

(71) Applicant: MARKFORGED, INC., Watertown, MA (US)

(72) Inventors: Joseph Roy-Mayhew, Watertown, MA (US); Zachary Farrell, Plymouth, MA (US)

(73) Assignee: MARKFORGED, INC., Waltham, MA (US)

( * ) Notice: Subject to any disclaimer, the term of this patent is extended or adjusted under 35 U.S.C. 154(b) by 1168 days.

(21) Appl. No.: 16/453,133

(22) Filed: Jun. 26, 2019

(65) Prior Publication Data
US 2019/0389090 A1 Dec. 26, 2019

Related U.S. Application Data

(60) Provisional application No. 62/690,072, filed on Jun. 26, 2018.

(51) Int. Cl.
*B22F 1/103* (2022.01)
*B33Y 70/10* (2020.01)
(Continued)

(52) U.S. Cl.
CPC .......... *C04B 35/63408* (2013.01); *B22F 1/10* (2022.01); *B22F 1/103* (2022.01); *B22F 1/108* (2022.01); *B22F 10/18* (2021.01); *B28B 1/001* (2013.01); *B33Y 40/10* (2020.01); *B33Y 70/10* (2020.01); *C04B 35/62635* (2013.01); *C04B 35/63416* (2013.01); *B22F 1/05* (2022.01); *B22F 12/17* (2021.01); *B22F 12/55* (2021.01); *B22F 2302/45* (2013.01);
(Continued)

(58) Field of Classification Search
None
See application file for complete search history.

(56) References Cited

U.S. PATENT DOCUMENTS 5,257,657 A 11/1993 Gore
5,337,961 A 8/1994 Brambani et al.
(Continued)

FOREIGN PATENT DOCUMENTS

| CN | 106700512 A | 5/2017 |
|---|---|---|
| EP | 3321002 A1 | 5/2018 |
| WO | 2018106733 A1 | 6/2018 |

OTHER PUBLICATIONS

Notification of Transmittal of the International Search Report and the Written Opinion of the International Searching Authority from corresponding PCT/US2019/039203 dated Oct. 18, 2019.
Extended European Search Report from corresponding European Application No. 19824941.9 dated Dec. 20, 2021.

*Primary Examiner* — Xiaobei Wang
(74) *Attorney, Agent, or Firm* — Lando & Anastasi, LLP

(57) ABSTRACT

A flexible 3D printing feedstock material is disclosed. The flexible 3D printing feedstock material includes 45-80 vol % of a powder having at least one of a metal powder and a ceramic powder, 0-5 vol % of a compatibilizer, 10-35 vol % of a soluble flexibilizer, and 5-35 vol % of a non-soluble binder component. Methods of forming the flexible 3D printing feedstock material by melt mixing the components are disclosed. Methods of producing a 3D printed part by operating a fused deposition modeling 3D printer loaded with a filament formed of the 3D printing feedstock material are also disclosed.

44 Claims, 9 Drawing Sheets

(51) Int. Cl.
- *C04B 35/634* (2006.01)
- *B28B 1/00* (2006.01)
- *C04B 35/626* (2006.01)
- *B33Y 40/10* (2020.01)
- *B22F 10/18* (2021.01)
- *B22F 1/10* (2022.01)
- *B33Y 80/00* (2015.01)
- *B33Y 10/00* (2015.01)
- *B22F 1/05* (2022.01)
- *B33Y 40/20* (2020.01)
- *B22F 12/17* (2021.01)
- *B22F 12/55* (2021.01)

(52) U.S. Cl.
CPC ........... *B22F 2998/00* (2013.01); *B33Y 10/00* (2014.12); *B33Y 40/20* (2020.01); *B33Y 80/00* (2014.12); *C04B 2235/96* (2013.01)

(56) References Cited

U.S. PATENT DOCUMENTS

| | | | |
|---|---|---|---|
| 5,598,200 | A | 1/1997 | Gore |
| 5,900,207 | A | 5/1999 | Danforth et al. |
| 6,202,734 | B1 | 3/2001 | Sackinger et al. |
| 8,523,331 | B2 | 9/2013 | Houben |
| 8,721,032 | B2 | 5/2014 | Kuznetsov et al. |
| 9,149,988 | B2 | 10/2015 | Mark et al. |
| 10,000,011 | B1 | 6/2018 | Mark |
| 2014/0291886 | A1 | 10/2014 | Mark et al. |
| 2014/0361460 | A1 | 12/2014 | Mark |
| 2015/0273577 | A1 | 10/2015 | Vader et al. |
| 2018/0154437 | A1* | 6/2018 | Mark ..................... B22F 10/10 |
| 2018/0162013 | A1 | 6/2018 | Fulop et al. |
| 2018/0162048 | A1* | 6/2018 | Gibson ................. C09D 123/12 |
| 2018/0257138 | A1 | 9/2018 | Mark |

* cited by examiner

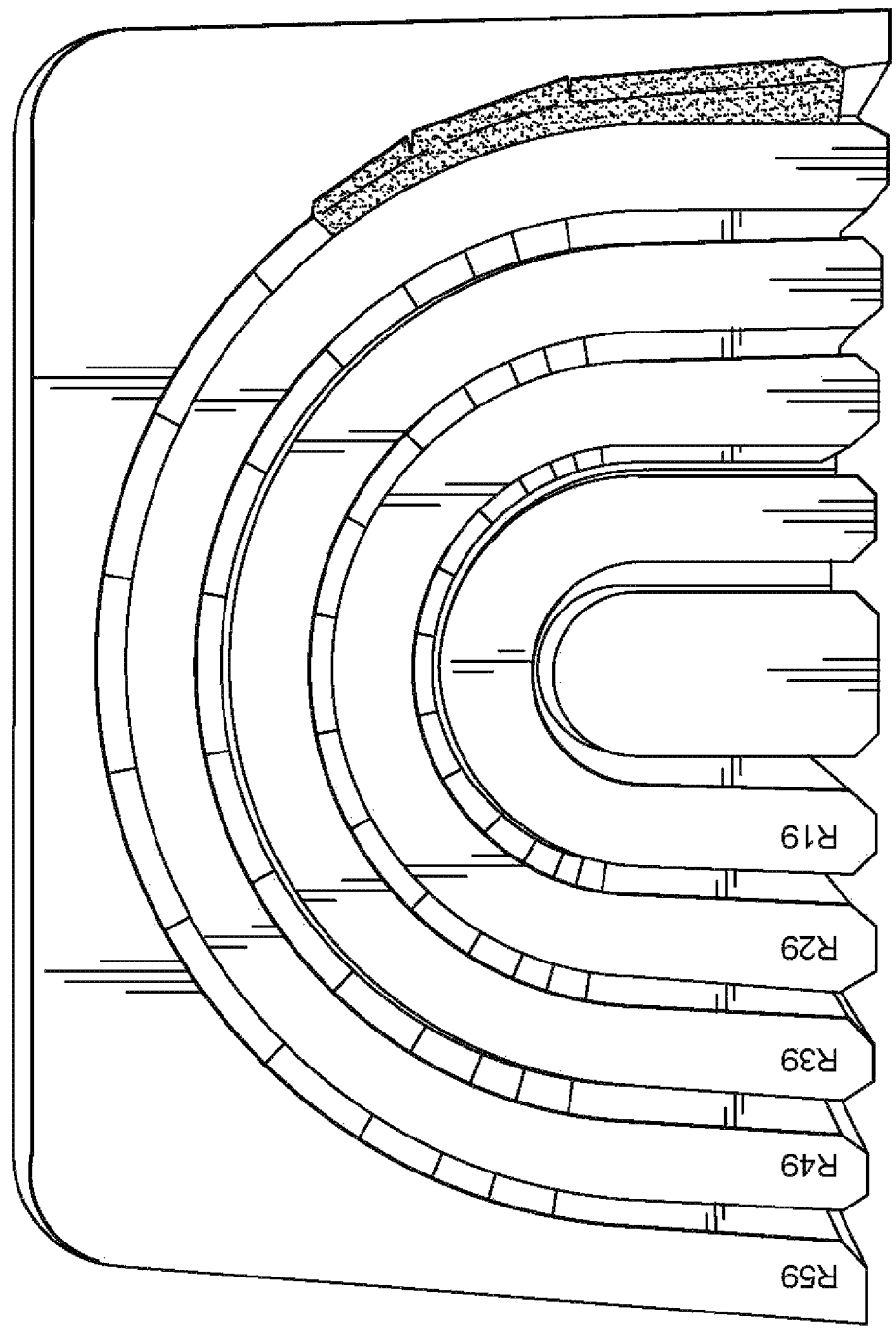

FLEXIBLE FEEDSTOCK

CROSS-REFERENCE TO RELATED APPLICATIONS

This application claims priority under 35 U.S.C. § 119(e) to U.S. Provisional Patent Application Ser. No. 62/690,072, titled "FLEXIBLE FEEDSTOCK," filed Jun. 26, 2018 which is incorporated by reference herein in its entirety.

FIELD

Aspects relate to three-dimensional printing of composite metal and/or ceramic materials.

BACKGROUND

"Three-dimensional printing," also referred to as 3D printing, as an art includes various methods for producing metal and/or ceramic parts. In 3D printing, three dimensional articles may be fabricated from feedstock in the form of metal, ceramic, or combination filaments.

SUMMARY

In accordance with an aspect, there is provided a flexible 3D printing feedstock material. The material may comprise 45-80 vol % of a powder comprising at least one of a metal powder and a ceramic powder, 0-5 vol % of a compatibilizer, 10-35 vol % of a soluble flexibilizer, and 5-35 vol % of a non-soluble binder component.

In certain embodiments, the material may comprise 45-80 vol % of a metal powder, 0-5 vol % of a compatibilizer, 10-35 vol % of a soluble flexibilizer, and 5-35 vol % of a non-soluble binder component.

In other embodiments, the material may comprise 45-80 vol % of a ceramic powder, 0-5 vol % of a compatibilizer, 10-35 vol % of a soluble flexibilizer, and 5-35 vol % of a non-soluble binder component.

The soluble flexibilizer may comprise a petrolatum.

The material may have 15-25 vol % of the petrolatum.

In some embodiments, particles of the powder may have a median size of less than 50 μm. For instance, the particles of the metal powder may have a median size of less than 50 μm. The particles of the ceramic powder may have a median size of less than 50 μm.

In some embodiments, the compatibilizer may comprise stearic acid.

In some embodiments, the non-soluble binder component may comprise linear-low density polyethylene (LLDPE).

In some embodiments, the non-soluble binder component may comprise at least one of high density polyethylene (HDPE) and polypropylene (PP).

In some embodiments, the material may further comprise a wax. The wax may comprise at least one of paraffin wax, castor wax, carnauba wax, microcrystalline wax, and bees wax.

In some embodiments, the material may further comprise a liquid hydrocarbon. The liquid hydrocarbon may comprise at least one of cyclohexane, mineral oil, and a polyalphaolephin.

In some embodiments, the material may further comprise at least one of ethylene vinyl acetate and a polyolefin copolymer.

In some embodiments, the material may have 60-75 vol % of the metal powder. The material may exhibit a flexural strain of greater than 3% while substantially maintaining structural integrity. The material may exhibit a flexural strain of greater than 10% while substantially maintaining structural integrity. The material may exhibit a flexural strain of greater than 25% while substantially maintaining structural integrity.

In accordance with another aspect, there is provided a method of producing a 3D printed part. The method may comprise operating a fused deposition modeling 3D printer loaded with a filament formed of the 3D printing feedstock material to print the 3D printed part.

In accordance with another aspect, there is provided a method of forming a flexible 3D printing feedstock material. The method may comprise melt mixing components including 45-80 vol % of a powder comprising at least one of a metal powder and a ceramic powder, 0-5 vol % of a compatibilizer, 10-25 vol % petrolatum as a soluble flexibilizer, and 5-35 vol % of a non-soluble binder component.

In certain embodiments, the method may comprise melt mixing components including 45-80 vol % of a metal powder, 0-5 vol % of a compatibilizer, 10-25 vol % petrolatum as a soluble flexibilizer, and 5-35 vol % of a non-soluble binder component.

In other embodiments, the method may comprise melt mixing components including 45-80 vol % of a ceramic powder, 0-5 vol % of a compatibilizer, 10-25 vol % petrolatum as a soluble flexibilizer, and 5-35 vol % of a non-soluble binder component.

In some embodiments, melt mixing the components may be performed under vacuum.

In some embodiments, melt mixing the components may comprise melting the non-soluble binder component, combining the petrolatum and the melted non-soluble binder component to form a first premixture, and combining the powder and the compatibilizer with the first premixture to form a melt mixture. For instance, the method may comprise combining the metal powder and the compatibilizer with the first premixture to form a melt mixture. The method may comprise combining the ceramic powder and the compatibilizer with the first premixture to form a melt mixture.

In some embodiments, the method may further comprise combining the powder and the compatibilizer to form a second premixture and combining the first premixture and the second premixture to form the melt mixture. For instance, the method may further comprise combining the metal powder and the compatibilizer to form a second premixture. The method may further comprise combining the ceramic powder and the compatibilizer to form a second premixture.

In some embodiments, the method further comprises forming the material into a filament by extrusion.

In some embodiments, the method further comprises producing a 3D printed part by operating a fused deposition modeling 3D printer with the filament to print the 3D printed part.

In accordance with another aspect, there is provided a flexible 3D printing feedstock material. The material may comprise 45-75 vol % of a powder comprising at least one of a metal powder and a ceramic powder, 0-5 vol % of a compatibilizer, 5-25 vol % of a non-soluble binder, 5-20 vol % of a soluble polymeric binder, and 5-25 vol % of a soluble tackifier.

In certain embodiments, the material may comprise 45-75 vol % of a metal powder and a ceramic powder, 0-5 vol % of a compatibilizer, 5-25 vol % of a non-soluble binder, 5-20 vol % of a soluble polymeric binder, and 5-25 vol % of a soluble tackifier.

In other embodiments, the material may comprise 45-75 vol % of a ceramic powder, 0-5 vol % of a compatibilizer, 5-25 vol % of a non-soluble binder, 5-20 vol % of a soluble polymeric binder, and 5-25 vol % of a soluble tackifier.

The material may comprise 56-66 vol % of the powder, 10-14 vol % LLDPE, 10-14 vol % ethylene-vinyl acetate, 12-18 vol % low molecular weight hydrocarbon resin tackifier, and 0-2% of the compatibilizer. For instance, the material may comprise 56-66 vol % of the metal powder, 10-14 vol % LLDPE, 10-14 vol % ethylene-vinyl acetate, 12-18 vol % low molecular weight hydrocarbon resin tackifier, and 0-2% of the compatibilizer. The material may comprise 56-66 vol % of the ceramic powder, 10-14 vol % LLDPE, 10-14 vol % ethylene-vinyl acetate, 12-18 vol % low molecular weight hydrocarbon resin tackifier, and 0-2% of the compatibilizer.

In accordance with yet another aspect, a flexible 3D printing feedstock material is provided. The flexible 3D printing feedstock material may comprise more than 45 vol % of a powder comprising at least one of a metal powder and a ceramic powder. The material may be solvent debindable. The material may be capable of flexing around a radius of 5 cm at 25° C. while substantially maintaining structural integrity.

In certain embodiments, the flexible 3D printing feedstock material may comprise more than 45 vol % of a metal powder.

In other embodiments, the flexible 3D printing feedstock material may comprise more than 45 vol % of a ceramic powder.

The disclosure contemplates all combinations of any one or more of the foregoing aspects and/or embodiments, as well as combinations with any one or more of the embodiments set forth in the detailed description and any examples.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure.

In the figures:

FIGS. 6A and 6B illustrate conventional feedstock material;

DETAILED DESCRIPTION

Figure 1:
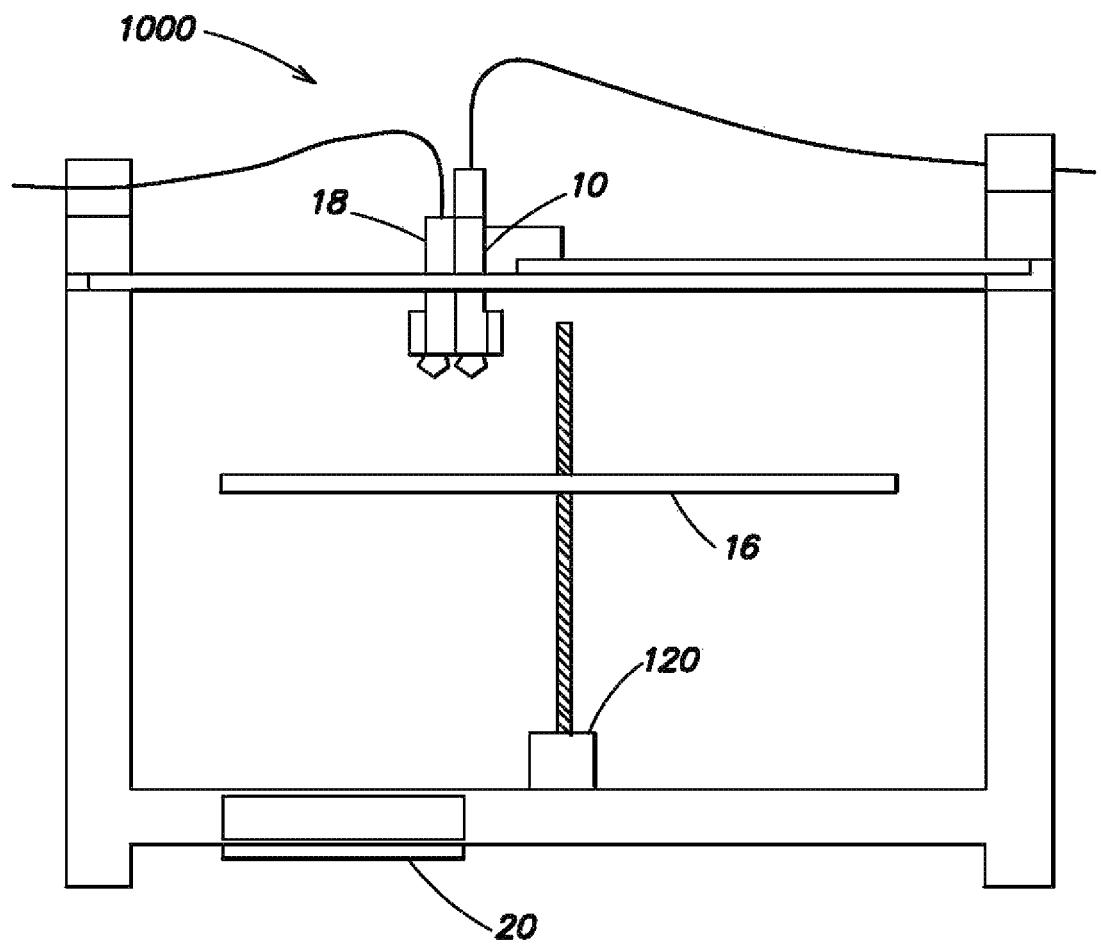
FIG. 1 is a schematic representation of a three-dimensional printer, according to one embodiment.

Additive manufacturing, or three-dimensional (3D) printing, refers to a class of technologies for the direct fabrication of physical products from a 3D computer model by a layered manufacturing process. In a fused deposition modeling (FDM) additive manufacturing system, a 3D part may be printed from a digital representation of the 3D part in a layer-by-layer manner by depositing a part material along toolpaths. The part material is deposited via a nozzle carried by a print head of a 3D-printing device or system and is deposited as a sequence of roads on a substrate in a build plane. The deposited part material fuses to previously deposited part material and is then solidified. The position of the print head relative to the substrate is then incremented along one or more print axes, and the process can then be repeated to form a 3D part resembling the 3D computer model.

The part material utilized in a fused deposition modeling system is generally molded into a filament feedstock. Current feedstocks typically comprise at least four components: a metal powder, a polymer, a wax, and a compatibilizer. Due to the high loading of metal powder (for example, 45-80 vol %) the resulting feedstock is often brittle. The brittle nature of traditional feedstocks may be desired to aid in the shape retention of formed parts. However, for fused deposition modeling (FDM) 3D printing applications, a traditional brittle feedstock filament can readily snap or break, making it unusable at room temperature. Accordingly, a flexible feedstock may be suitable for such 3D printing at room temperature.

Some conventional feedstock formulations are flexible when heated. Other formulations are flexible at room temperature. Some formulations that are flexible at room temperature contain lower filler contents and/or require catalytic debind systems. Such feedstocks are generally undesirable due to the time and additional processing equipment required. Other formulations that are flexible at room temperature are fragile and unsuitable for commercial 3D printing devices that require fast movements and robust spools of material. In addition, these formulations often require thermal debind systems, which are generally less desirable than solvent debind systems due to the time and additional equipment needed for these processes.

A flexible feedstock in a filament form is disclosed herein. The flexible feedstock may be continuously fed through a printer without the need for pre-heating. The flexible feedstock may be used with existing equipment, for example, in commercial 3D printing devices, and may be used with a solvent debind system.

As used herein, a "sintering temperature" of a material is a temperature range at which the material is sintered. The sintering temperature is typically a lowest temperature range at which the material reaches the expected bulk density by sintering. For example, the density may be 90 percent or higher of the peak bulk density it is expected to reach in a sintering furnace.

"Extrusion" may mean a process in which a stock material is pressed through a die to take on a specific shape of a lower cross-sectional area than the stock material. Fused Filament Fabrication ("FFF"), sometimes called Fused Deposition Manufacturing ("FDM"), is typically an extrusion process. Similarly, "extrusion nozzle" shall mean a device designed to control the direction or characteristics of an extrusion fluid flow, especially to increase velocity and/or restrict cross-sectional area, as the fluid flow exits (or enters) an enclosed chamber.

"Shell" and "layer" are used in many cases interchangeably, a "layer" being one or both of a subset of a "shell" (e.g., a layer may be a 2.5D limited version of a shell, a lamina extending in any direction in 3D space) or superset of a "shell" (e.g., a shell may be a layer wrapped around a 3D surface). Shells or layers are typically deposited as 2.5D successive surfaces with 3 degrees of freedom (which may be Cartesian, polar, or expressed "delta") and as 3D successive surfaces with 4-6 or more degrees of freedom.

In the disclosure, "three dimensional printer" and "3D printer" is inclusive of both discrete printers and/or manufacturing machinery which carry out an additive manufacturing sub-process within a larger process. A 3D printer is typically controlled by a motion controller. The motion controller may interpret dedicated G-code and drive various actuators of the 3D printer in accordance with the G-code.

"Fill material" includes composite material formed of a debindable material and a sinterable powder, e.g., before debinding.

"Fill material" includes material that may be deposited in substantially homogenous form as extrudate, fluid, or powder material, and is solidified. The fill material may be solidified by hardening, crystallizing, or curing.

"Substantially homogeneous" refers to a substantially uniform or even combination. In general, a substantially homogeneous combination may have a similar composition throughout different samples. Substantially homogeneous is used to refer to powders, fluids, blends, dispersions, colloids, suspensions, and mixtures.

"Deposition head" may include jet nozzles, spray nozzles, extrusion nozzles, conduit nozzles, and/or hybrid nozzles.

"Filament" refers to a build material. As used herein, "filament" may generally refer to the entire cross-sectional area of a (e.g., spooled) build material.

"Powder" may generally refer to a collection of particles having an average dimension of below 1 millimeter in any axis measured. Generally, in 3D printing, powders may be spheroid, rounded, or otherwise compact. Powder particles may generally have diameters ranging from less than 1 to 75 micrometers. For instance, powder particles may have diameters of less than 1 micrometer. Powder particles may have diameters of between 1-25 micrometers. Powder particles may have diameters of between 5-75 micrometers. A powder may have an average diameter of particles as described herein. A powder may have at least 90%, at least 95%, or at least 99% of its particles having a diameter as described herein. Powder particles may be produced by known methods, for example, water atomization, gas atomization, vacuum atomization, plasma atomization, granulation, and sol-gel techniques.

As used herein, "compatibilizer" includes a component to improve cohesion. For example, a "compatibilizer" may be included in a feedstock to improve cohesion of the feedstock by interfacing between the powder and other components. A compatibilizer may be soluble in a wash solvent.

As used herein, a "flexibilizer" includes a component which provides flexibility to the feedstock composition at room temperature. A soluble flexibilizer may generally be soluble in a selected wash solvent. Conventional feedstocks with traditional components are generally brittle. Feedstocks disclosed herein including one or more flexibilizer may generally be flexible. Petrolatum is an example of a soluble flexibilizer. Other examples are provided in the disclosure.

"Petrolatum" may include a waxy hydrocarbon paste which is generally semi-solid at 25° C. Common names of certain petrolatum materials include petroleum jelly and soft paraffin. An exemplary petroleum jelly is Vaseline® (distributed by Unilever plc, London, United Kingdom). Petrolatum is often a mixture of hydrocarbons having an average carbon number above 25. Hydrocarbon impurities are common in some grades of petrolatum.

As used herein "non-soluble binder" includes a component which primarily remains in a combination throughout a washing stage. The non-soluble binder may be a component of the feedstock which is substantially insoluble in a selected wash solvent. The non-soluble binder component may be thermally removed in a furnace either before or during the sintering stage. Many polymers and copolymers may be non-soluble binder components.

"Soluble tackifier" includes a component which generally improves adhesion of a composition. The soluble tackifier may be a component of the feedstock which is included to improve adhesion of the feedstock during printing. Soluble tackifiers may include low molecular weight hydrocarbon resins.

"Room temperature" generally refers to ambient temperature. Ambient temperature may vary with geographic region, time of year, time of day, and the presence or absence of a heating and/or cooling system in the building. Often "room temperature" is between 20° C. and 27° C. In certain embodiments, "room temperature" may be about 25° C.

Aspects and embodiments disclosed herein include robust filaments of metal/ceramic feedstock for use in additive manufacturing. In certain embodiments, the filaments may be used for solvent-debind metal injection molding feedstock.

While additive manufacturing methods are generally described herein, it is to be understood that the disclosed flexible feedstock material may similarly be utilized as metal/ceramic injection molding feedstock. The disclosed feedstock may form parts which can be one or more of bent, rotated, and transformed to cause desired geometries. The disclosed feedstock may be used to provide built-in stress profiles, as a viscosity modifier for metal injection molding (MIM)/ceramic injection molding (CIM) feedstock, or as a processing aid for MIM/CIM feedstock.

Three-dimensional printing may generally include depositing an extruded feedstock material, optionally with a binder, in a layer by layer manner to form a printed part (also referred to herein as a green body). The printed part may be post-processed as necessary to form a finalized part (also referred to herein as a brown body). Post-processing procedures may include debinding to remove the binder. Post-processing procedures may include sintering to increase strength and density of the printed part.

The sintering may take place in an inert gas, a reducing gas, a reacting gas, or a vacuum. Application of heat (and optionally pressure) may eliminate internal pores, voids, and/or microporosity between and/or within the metal or ceramic beads through at least diffusion bonding and/or atomic diffusion.

The debinding process may comprise thermal, solvent, and/or catalytic debinding. In a thermal debinding process, a part containing binder is typically heated at a given rate under controlled atmosphere. Upon heating, the binder decomposes by thermal cracking into small molecules that are swept away by the gas leaving the oven. In solvent debinding, a part containing binder is typically subject to dissolving the binder in appropriate solvent. Common solvents include, for example, acetone and/or heptane. In catalytic debinding, the part is typically brought into contact with an atmosphere that contains a gaseous catalyst that accelerates cracking of the binder, which can be carried away. In accordance with certain embodiments, solvent debinding may be suitable for parts produced with the feedstock disclosed herein.

FIG. 1 shows an exemplary 3D printer 1000, according to at least one embodiment. The printer 1000 includes a first print head 18 that includes a first extrusion nozzle configured to extrude print material from a filament to form a printed part on a build platform 16. The filament provided to the printer 1000 can include a polymer binder and metal powder particles (e.g., within thermoplastic or curing binder). The printer 1000 operates by depositing print material via the extrusion nozzle on the first print head 18 in a sequence of roads on a build platen 16 or a previously deposited layer of the print material. The deposited material fuses to the build platform or the previously deposited layer of print material and is then solidified. The position of the first print head 18 relative to the build platform 16 is then incremented along one or more print axes, and the process is repeated to form a 3D part resembling a 3D computer model.

Figure 3:
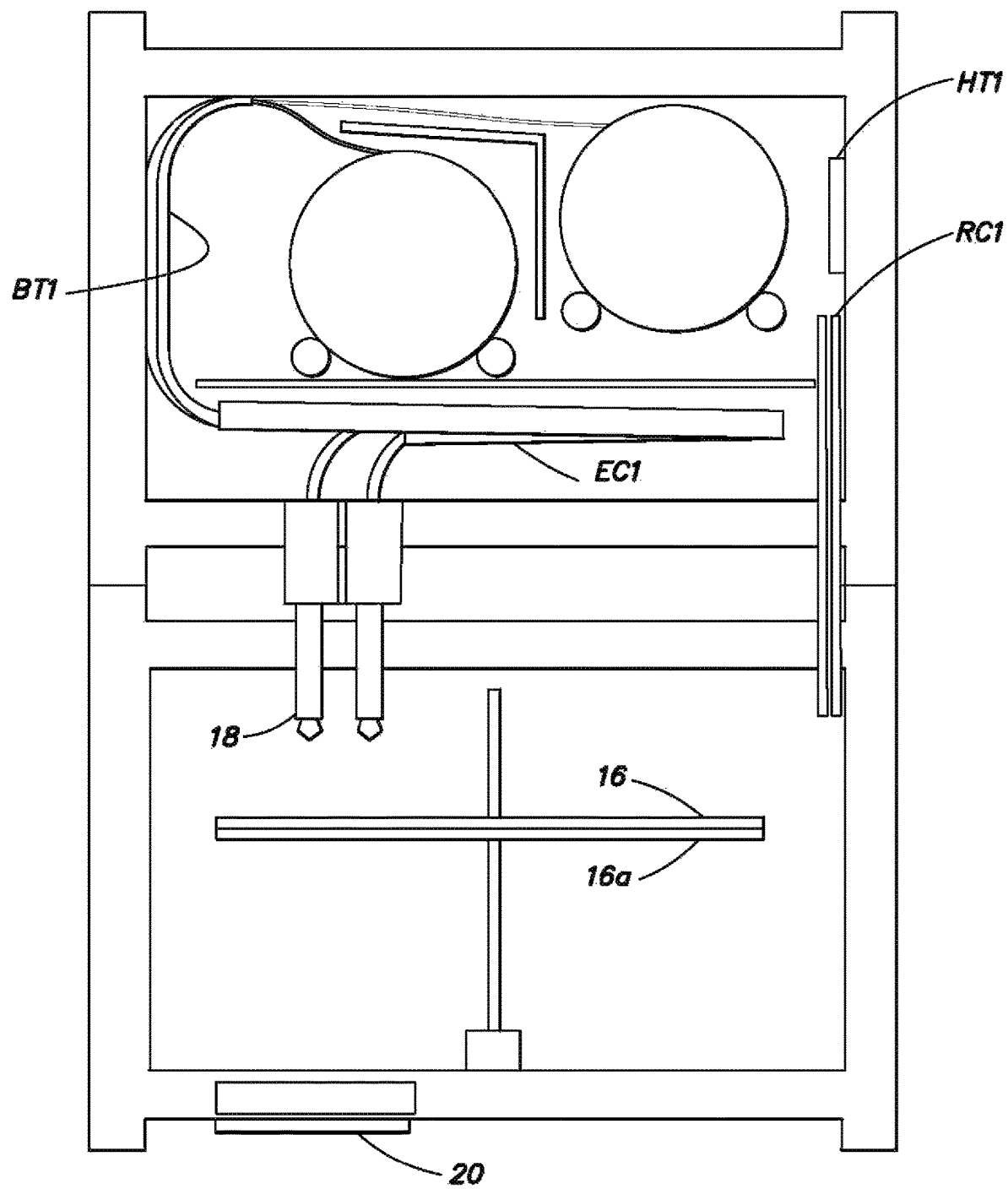

As shown in FIG. 3, the printer includes a second print head 10 (identified in FIG. 1). The second print head 10 can be utilized, similarly to the first print head 18, to deposit desired print material via a second extrusion nozzle onto a printed part or build surface. In some embodiments, the second print head 10 is configured to deposit a different type of material (e.g., a release material) and/or utilize a different printing technique then the first print head 18. Although FIG. 1 in general shows a Cartesian arrangement for relatively moving the print head in three orthogonal translation directions, other arrangements are considered within the scope of the disclosure.

As described above, filament feedstock material is provided to the print head 18 of the printer 1000 and the print head 18 deposits print material from the feedstock material via the first extrusion nozzle. Depending on the feedstock material, the extrusion nozzle may optionally be heated to a controlled temperature selected for the feedstock material to maintain a predetermined viscosity, force of adhesion of bonded ranks, melting properties, and/or surface finish.

After the feedstock material of the filament is substantially heated, the material can be applied onto the build platen 16 to build successive layers of a part to form a three-dimensional structure. The relative position and/or orientation of the build platen 16 and print head(s) 18, 10 are typically controlled by a controller 20 to deposit each successive layer of material described herein in the desired location and direction. As shown in FIG. 3, the controller 20 operates an actuator 120 (identified in FIG. 1) to control movement of the build platen 16.

Figure 2:
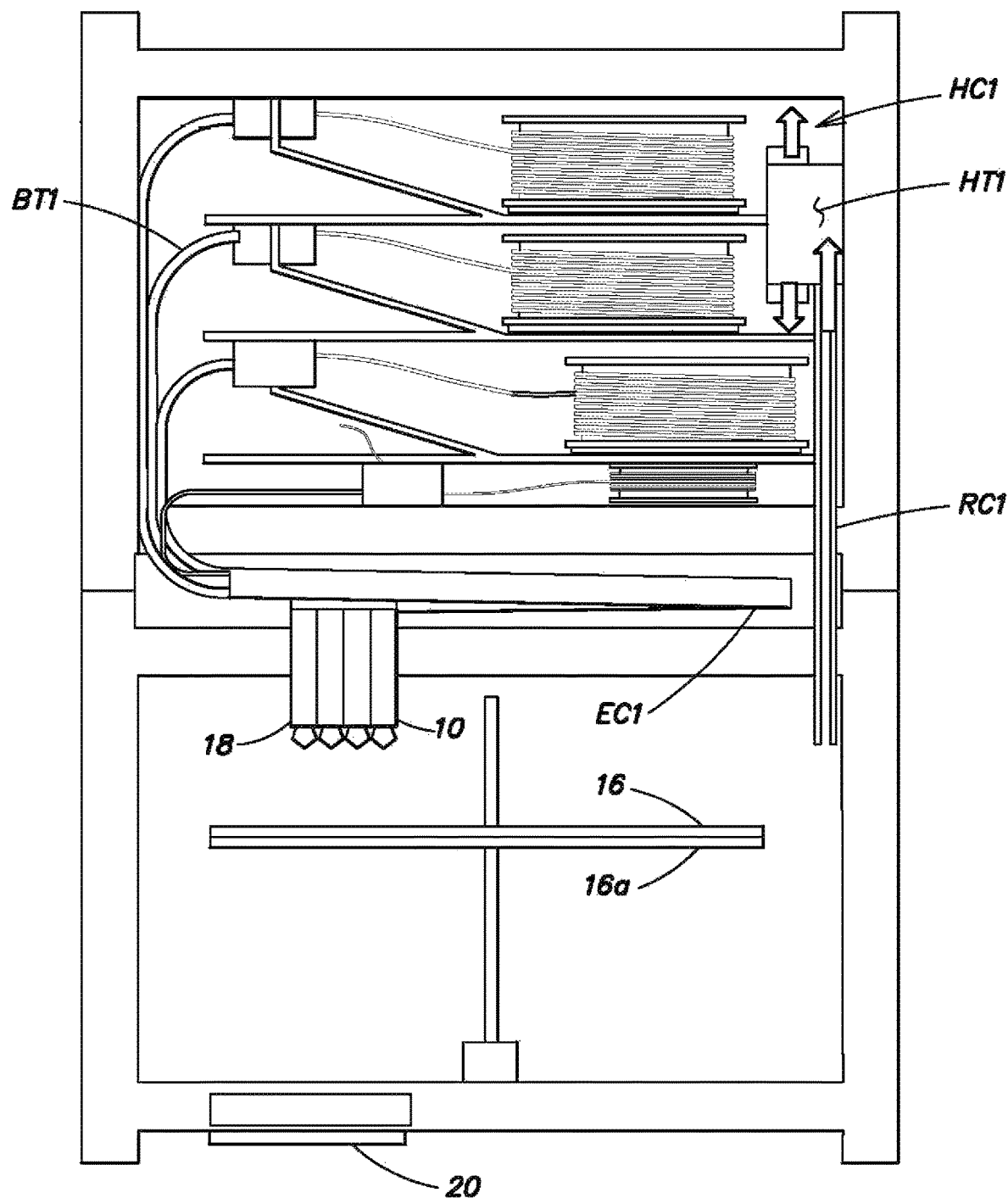
FIGS. 2-4 are schematic views of 3D printers in which conventional filament materials are configured in environmental conditions suitable for printing.
Figure 4:
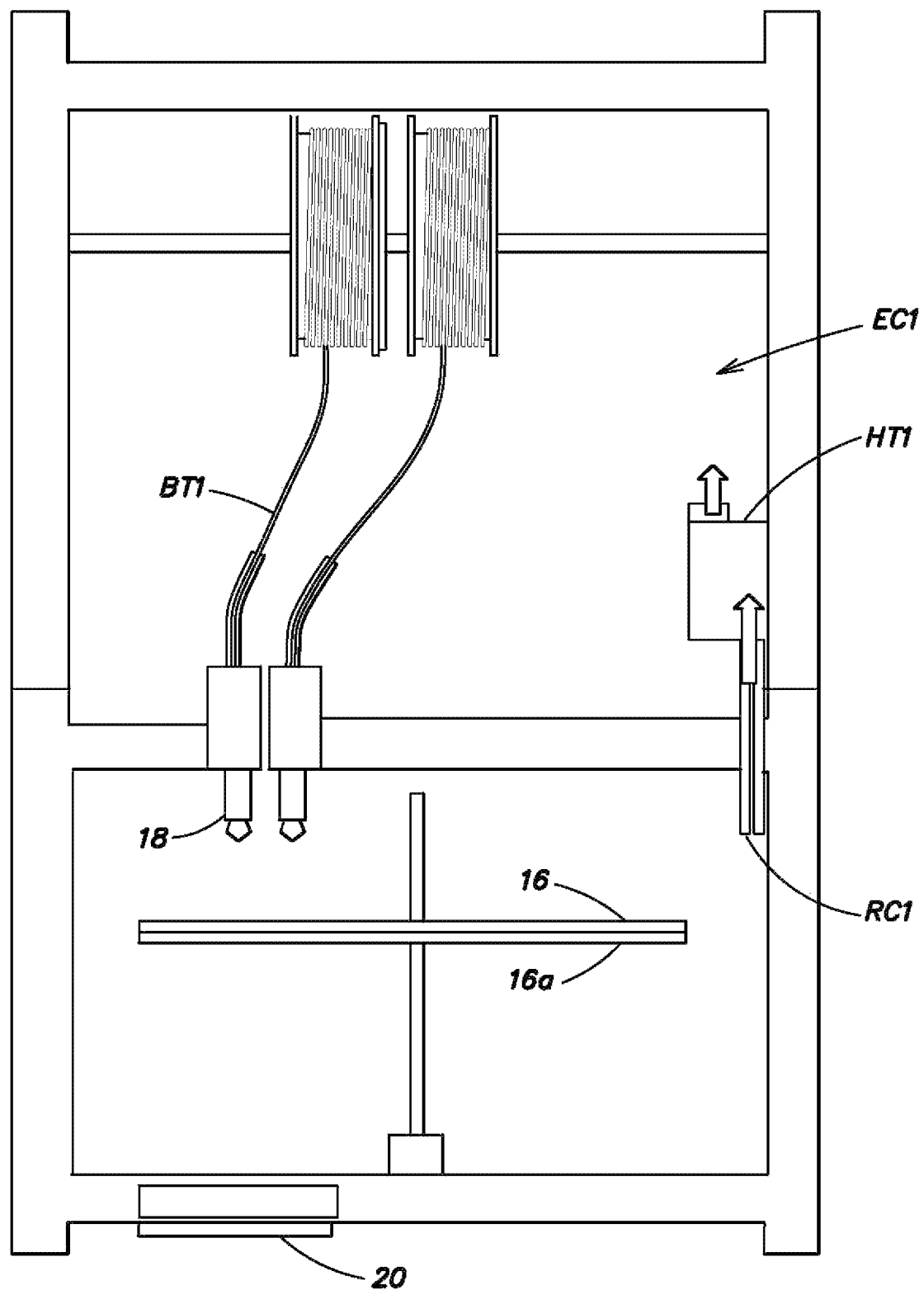

Due to the brittle nature of conventional feedstocks at room temperature, 3D printers for printing parts with these feedstocks are typically specially constructed to handle the feedstocks without breakage. Suitable structures for handling materials brittle at room temperature are shown in FIGS. 2-4 in which 3D printers are schematically depicted that are otherwise constructed similarly to the 3D printer of FIG. 1. Similar components are identified with like numerals. The 3D printers of FIGS. 2 and 3 may accept spools of feedstock material that were wound at a temperature higher than room temperature. As shown in FIGS. 2-4, spools of feedstock are each in a joint heated chamber (HC1) heated by a heater HT1. Heater HT1 may be a passive, e.g., radiant and convection heater, or include a blower. The build plate 16 may be heated by a build plate heater 16a. A return channel RC1 may permit air to be drawn into the heated chamber HC1 from the printing compartment. Heated air within the heated chamber HC1 may be driven through the Bowden tubes BT1 surrounding the driven filaments to maintain the temperature at an elevated level as the warmed filament is moved through the Bowden tubes and, in some cases, flexed during printing. Housing EC1 may house the Bowden tubes.

The 3D printers of FIGS. 2-4 differ in the orientation of the spools and the driving system of the filament. In FIG. 2, spools are horizontally arranged on a lazy-susan type holder that permits rotation, and the filament drivers (including their, e.g., elastomer drive wheels) are arranged at a convenient location mid-way between the spools and the Bowden tubes. This mid-drive arrangement is suitable if the filament is not softened to an elastomer range in the heating chamber HC1. In FIG. 3, the spools are vertically arranged in a rotating spool holder (e.g., on rollers), and the filament drivers or "extruders" (including their driving wheels, e.g., of elastomer) are arranged directly upstream of the melt chamber in the respective nozzles 18. In FIG. 4, the spools are vertically arranged on an axle, and the filament, and the filament drivers or "extruders" (including their driving wheels, e.g., of elastomer) are arranged directly upstream of the melt chamber in the respective nozzles 18. Bowden tubes may guide the filaments for part of the height leading up to the spools.

In implementations utilizing embodiments of the flexible feedstock disclosed herein, one or more of the spools disclosed in FIGS. 2-4 may include a filament formed of the flexible feedstock compound. The flexible feedstock may be sufficiently flexible at ambient temperature that the chamber(s) in which it is disposed may be maintained at ambient temperature or not temperature controlled. This may reduce the complexity and operating cost of the 3D printers.

As previously described, the disclosed flexible feedstock may be used to form parts which can be one or more of bent, rotated, and transformed at the green state and in room temperature to cause desired geometries. In some embodiments, the flexible feedstock may be used in a 3D printer that is free of one or more of the heated elements described above with respect to FIGS. 2-4. For example, the flexible feedstock may be used in a 3D printer that is substantially free of a temperature control unit. The flexible feedstock may be used in a 3D printer that is substantially free of a heating unit. The flexible feedstock may be used in a 3D printer that is substantially free of one or more of a heated chamber HC1, a heated spool, a return channel RC1, a heated Bowden tube BT1, and a heated housing EC1. The 3D printer may otherwise comprise any one or more of the additional components described above. For example, the 3D printer may comprise any one or more of the spool embodiments described with respect to FIGS. 2-4.

The disclosed feedstock composition surprisingly has high flexibility and/or elongation, even at high filler loadings (e.g., greater than 60 vol % and/or greater than 92 wt %). In particular, the disclosed feedstock may be used in a 3D printer at room temperature while substantially maintaining structural integrity. Failure of structural integrity includes, for example, cracking, fracturing, and breaking of a filament or feedstock material.

The composition generally includes at least one petrolatum which may provide flexibility and increase structural integrity. The flexibility of the composition is surprising as related compounds conventionally used in industry, including, for example, paraffin wax, castor wax, microcrystalline wax and others, do not enable such a degree of flexibility or structural integrity in otherwise similar formulations.

Embodiments of the flexible feedstock composition disclosed herein may include at least one metal or ceramic powder. The composition may comprise a concentration of metal or ceramic powder selected based on a desired composition of a final manufactured part. The metal or ceramic powder may be included in amounts of greater than about 45 vol %. The metal or ceramic powder may be included in amounts of between, for example, 45 vol % and 80 vol %. The metal or ceramic powder may be included in amounts of, for example, 45 vol %, 46 vol %, 47 vol %, 48 vol %, 49 vol %, 50 vol %, 51 vol %, 52 vol %, 53 vol %, 54 vol %, 55 vol %, 56 vol %, 57 vol %, 58 vol %, 59 vol %, 60 vol %, 61 vol %, 62 vol %, 63 vol %, 64 vol %, 65 vol %, 66 vol %, 67 vol %, 68 vol %, 69 vol %, 70 vol %, 71 vol %, 72 vol %, 73 vol %, 74 vol %, 75 vol %, 76 vol %, 77 vol %, 78 vol %, 79 vol %, or 80 vol %. In certain embodiments, the metal or ceramic powder particles may have a median diameter of about 50 µm or less.

Metals which may be formed into the feedstock filaments disclosed herein include aluminum, titanium, iron, chromium, copper, nickel, and mixtures and/or alloys thereof. Certain metal filaments include steel, for example, stainless steel, tool steels, and construction steels. Other metals include, e.g., amorphous metal, glassy metal, and metallic glass. In certain embodiments, the feedstock filament may include or be formed of ceramic materials.

Embodiments of the flexible feedstock composition disclosed herein may include at least one solvent dissolvable component. The at least one component may typically define a void space in the material upon dissolution in the solvent. The defined void space may allow passageways for thermal debind gas evolution. As disclosed herein, the solvent dissolvable component which defines a void space upon dissolution may be referred to as a soluble brown part porosity maker.

The composition may comprise a concentration of soluble brown part porosity maker sufficient to provide a desired density or hardness of the final part. The soluble brown part porosity maker may be included in amounts of between, for example, 10 vol % and 25 vol % or between 10 vol % and 35 vol %. Potential soluble components, for example, components of the brown part porosity maker, may include one or more of wax (e.g., paraffin, castor, carnauba, microcrystalline, bees), liquid hydrocarbons (e.g., cyclohexane, mineral oil, polyalphaolephins), soluble polymers (e.g., ethylene-vinyl acetate, polyolefin copolymers), polyisobutylene, polypropylene-polyethylene copolymer, polyolefin plastomers, olefin block copolymers, hydrocarbon resins, and/or phenolic resins.

The flexible feedstock composition may generally include at least one flexibilizer. The flexibilizer may be selected based on the composition of the feedstock material to provide flexibility and/or structural integrity to the feedstock filament at room temperature. In certain embodiments, the flexibilizer may be soluble in the wash solvent. The flexibilizer may be included in an amount sufficient to provide a desired flexibility and/or structural integrity of the filament or feedstock material at a target room temperature for the production operation. The flexibilizer may be included in amounts of greater than about 10 vol %. The flexibilizer may be included in amounts of less than about 35 vol %. The flexibilizer may be included in amounts of between, for example, about 10 vol % and about 35 vol %. In certain embodiments, the flexibilizer may be included in amounts of 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 26 vol %, 27 vol %, 28 vol %, 29 vol %, 30 vol %, 31 vol %, 32 vol %, 33 vol %, 34 vol %, or 35 vol %.

The brown part porosity maker, the backbone component, or a combination of these may comprise the flexibilizer. The flexibilizer may include, for example, a liquid hydrocarbon (e.g., mineral oil) in a wax-based composition. The flexibilizer may include, for example, microcrystalline wax. The flexibilizer may include, for example, an elastomer. The flexibilizer may include, for example, petrolatum. In general, petrolatum provides a higher degree of flexibility than the alternative disclosed flexibilizers. Compositions may include one or more of the flexibilizers disclosed herein.

Embodiments of the flexible feedstock composition disclosed herein may include a non-soluble backbone component. The non-soluble backbone component may be included in an amount sufficient to provide a desired density or hardness to the final part. The non-soluble backbone component may be included in an amount between 5 vol % and 35 vol %. The non-soluble backbone component may be included in amounts of greater than about 5 vol %. The non-soluble backbone component may be included in amounts of less than about 35 vol %. In certain embodiments, the non-soluble backbone component may be included in amounts of 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 26 vol %, 27 vol %, 28 vol %, 29 vol %, 30 vol %, 31 vol %, 32 vol %, 33 vol %, 34 vol %, or 35 vol %.

An exemplary non-soluble backbone component is linear-low density polyethylene. A polymer mixture may make up the backbone component. Examples of polymers that may be included in the backbone component include low-density polyethylene (LDPE), high density polyethylene (HDPE), polypropylene, copolymers, terpolymers, monomers, and gums as well as any one or more of a polypropylene copolymer, a polypropylene copolymer grafted with maleic anhydride, a polypropylene-polyethylene copolymer, triblock copolymers of styrene-ethylene-propylene, N-butyl acrylate copolymers, polyisobutylene, polyolefin plastomers, and/or olefin block copolymers.

Embodiments of the flexible feedstock composition disclosed herein may include one or more additives. In certain embodiments, the balance of the composition comprises one or more additives. For instance, the one or more additives may be included in an amount between 0 and 10 vol %. The one or more additives may be included in amount between 0 vol % and 25 vol %. Exemplary additives include that may include a compatibilizer, a tackifier, an antioxidant, and/or a rheology modifier (e.g., a flow aid or anti-slip agent). Other compounds may be included as additives.

Embodiments of the flexible feedstock disclosed herein may include a compatibilizer. The composition may comprise a concentration of compatibilizer sufficient to provide cohesion of the feedstock composition, for example, cohesion of powdered materials and wet materials. The compatibilizer may be included in amounts less than about 5 vol %. The compatibilizer may be included in amounts of between 0 and 5 vol %. In certain embodiments, the compatibilizer may be included in amounts of, for example, 1 vol %, 2 vol %, 3 vol %, 4 vol %, or 5 vol %. One exemplary compatibilizer is stearic acid.

Embodiments of the flexible feedstock may include a tackifier. The composition may comprise a concentration of tackifier sufficient to provide adhesion of the composition materials. The composition may comprise a concentration of tackifier sufficient to produce a substantially homogeneous feedstock material and/or final part. The tackifier may be included in amounts greater than about 5 vol %. The tackifier may be included in amounts less than about 25 vol %. The tackifier may be included in amounts of between about 5 vol % and about 25 vol %. In certain embodiments, the tackifier may be included in amounts of 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, or 25 vol %.

More than one component can make up any one or more of the metal or ceramic powder(s), the brown part porosity maker, the backbone component, and/or the additives.

Additional or alternative polymers that may be included in the flexible feedstock composition may include any one or more of polyolefins (such as poly ethylene, polypropylene, and the like), polyimides, polyesters (such as poly(ethylene terephthalate), poly(ethylene naphthalate), liquid crystalline polyesters, and the like), polyamides (including polyterephthalamides), aramids (such as Kevlar R and Nomex R), fluoropolymers (such as fluorinated ethylene propylene (FEP), polytetrafluoroethylene (PTFE), poly(vinyl fluoride), poly(vinylidene fluoride), and the like), polyetherimides, poly(vinyl chloride), poly (vinylidene chloride), polyurethanes, cellulosic polymers, SAN, ABS, polycarbonates, polyacrylates, thermoset epoxies and polyurethanes, and/or elastomers, including, for example, thermoplastics and thermosets, and including rubbers (such as natural rubber) and silicones.

Embodiments of the flexible feedstock composition disclosed herein may include at least one binder. The binder may be incorporated in the filament or provided separately by the 3D printer. The binder may comprise a soluble-pyrolysable binder and/or a pyrolysable second stage binder. In other embodiments, the binder may comprise a non-soluble binder. The binder may be included in amounts of greater than about 5 vol %. The binder may be included in amounts of less than about 35 vol %. The binder may be included in amounts of, for example, between about 5 vol % and about 35 vol %. In certain embodiments, the binder may be included in amounts of 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 26 vol %, 27 vol %, 28 vol %, 29 vol %, 30 vol %, 31 vol %, 32 vol %, 33 vol %, 34 vol %, or 35 vol %.

Some soluble-pyrolysable binder combinations include one or more of polyethylene glycol (PEG), polymethyl methacrylate (PMMA) (optionally in emulsion form), stearic acid, waxes (for example, carnauba, bees wax, paraffin), steatite, polyethylene (PE), and polyvinylbutyral (PVB). Some pyrolysable second stage binders may include one or more of polyolefin resins polypropylene (PP), high-density polyethylene (HDPE), linear low-density polyethylene (LLDPE), and polyoxymethylene copolymer (POM). Examples of polymeric binders that may be included in the flexible feedstock composition include polyethers such as poly(ethylene oxide)s (also known as poly(ethylene glycol)s, poly(propylene oxide)s, (also known as poly(propylene glycol)s, ethylene oxide-propylene oxide copolymers, cellulosic resins (such as ethyl cellulose, ethyl hydroxyethyl cellulose, carboxymethyl cellulose, cellulose acetate, cellulose acetate propionates, and cellulose acetate butyrates), and poly(vinylbutyral), polyvinyl alcohol and its derivatives, ethylene/vinyl acetate polymers, acrylic polymers and copolymers, styrenefacrylic copolymers, styrene-maleic anhydride copolymers, isobutylene/maleic anhydride copolymers, vinyl acetate/ethylene copolymers, ethylene-acrylic acid copolymers, polyolefins, polystyrenes, olefin and styrene copolymers, epoxy resins, acrylic latex polymers, polyester acrylate oligomers and polymers, and/or polyester diol diacrylate polymers.

In certain non-limiting exemplary embodiments, the flexible feedstock may comprise, consist essentially of, or consist of 45-80 vol % at least one metal or ceramic powder, 10-35 vol % a soluble brown part porosity maker, 5-35 vol % a non-soluble backbone component, and 0-10 vol % additives including, for example, one or more of a compatibilizer, a tackifier, an antioxidant, and a rheology modifier. In other non-limiting exemplary embodiments, the flexible feedstock may comprise, consist essentially of, or consist of 65-70 vol % at least one metal or ceramic powder, 15-20 vol % a soluble brown part porosity maker, 10-15 vol % a non-soluble backbone component, and 2-5 vol % additives including, for example, one or more of a compatibilizer, a tackifier, an antioxidant, and a rheology modifier.

Another embodiment of a flexible feedstock composition may comprise, consist essentially of, or consist of 45-75 vol % of a metal or ceramic powder, 0-5 vol % of a compatibilizer, 5-25 vol % of a non-soluble binder, 5-20 vol % of a soluble polymeric binder, and 5-25 vol % of a soluble tackifier. One exemplary embodiment may comprise, consist essentially of, or consist of 56-66 vol % metal, 10-14 vol % LLDPE, 10-14 vol % ethylene-vinyl acetate, 12-18 vol % low molecular weight hydrocarbon resin tackifier, and 0-2% compatibilizer. The flexible feedstock disclosed herein may maintain structural integrity under applied stress and strain. Strain at break is a measure of the flexibility of the sample. Embodiments of the flexible feedstock disclosed herein may have a strain at break of 5% or greater, 10% or greater, or 25% or greater. The measures of strain at break may be conserved even when highly loaded with metal or ceramic powder. For example, a feedstock having 60% or more metal or ceramic powder by volume may maintain the disclosed strain at break values.

Illustrative exemplary feedstock material compositions are disclosed in Tables 1 and 2.

TABLE 1

Illustrative Exemplary Feedstock Compositions

| ID | Metal or Ceramic Powder (vol %) | Compatibilizer (vol %) | Flexible Solubilizer (vol %) | Non-soluble binder (vol %) |
|---|---|---|---|---|
| A | 45 | 5 | 15 | 35 |
| B | 45 | 5 | 30 | 20 |
| C | 50 | 0 | 20 | 30 |
| D | 50 | 5 | 15 | 30 |
| E | 50 | 2 | 18 | 30 |
| F | 50 | 0 | 30 | 20 |
| G | 50 | 3 | 32 | 15 |
| H | 55 | 5 | 30 | 10 |
| I | 55 | 5 | 20 | 20 |
| J | 55 | 0 | 10 | 35 |
| K | 55 | 0 | 35 | 10 |
| L | 60 | 2 | 13 | 25 |
| M | 60 | 2 | 18 | 20 |
| N | 60 | 5 | 20 | 15 |
| O | 60 | 0 | 20 | 20 |
| P | 65 | 0 | 10 | 25 |
| Q | 65 | 0 | 20 | 15 |
| R | 65 | 5 | 25 | 5 |
| S | 65 | 5 | 20 | 10 |

TABLE 1-continued

Illustrative Exemplary Feedstock Compositions

| ID | Metal or Ceramic Powder (vol %) | Compatibilizer (vol %) | Flexible Solubilizer (vol %) | Non-soluble binder (vol %) |
|---|---|---|---|---|
| T | 70 | 0 | 10 | 20 |
| U | 70 | 3 | 20 | 7 |
| V | 70 | 5 | 10 | 15 |
| W | 70 | 5 | 20 | 5 |
| X | 75 | 0 | 10 | 15 |
| Y | 75 | 5 | 10 | 10 |
| Z | 80 | 5 | 10 | 5 |

TABLE 2

Illustrative Exemplary Feedstock Compositions

| ID | Metal or Ceramic Powder (vol %) | Compatibilizer (vol %) | Non-soluble binder (vol %) | Soluble polymeric binder (vol %) | Soluble tackifier (vol %) |
|---|---|---|---|---|---|
| AA | 45 | 0 | 25 | 5 | 25 |
| BB | 45 | 0 | 15 | 20 | 20 |
| CC | 45 | 5 | 10 | 20 | 20 |
| DD | 50 | 0 | 5 | 20 | 25 |
| EE | 50 | 0 | 25 | 20 | 5 |
| FF | 50 | 5 | 5 | 20 | 20 |
| GG | 50 | 5 | 15 | 5 | 25 |
| HH | 55 | 0 | 15 | 20 | 10 |
| II | 55 | 0 | 25 | 15 | 5 |
| JJ | 55 | 5 | 5 | 20 | 15 |
| KK | 55 | 5 | 5 | 10 | 25 |
| LL | 60 | 0 | 20 | 15 | 5 |
| MM | 60 | 2 | 18 | 5 | 15 |
| NN | 60 | 5 | 5 | 10 | 20 |
| OO | 60 | 5 | 25 | 5 | 5 |
| PP | 65 | 0 | 25 | 5 | 5 |
| QQ | 65 | 2 | 5 | 5 | 23 |
| RR | 65 | 5 | 16 | 7 | 7 |
| SS | 65 | 5 | 10 | 8 | 12 |
| TT | 70 | 0 | 15 | 10 | 5 |
| UU | 70 | 0 | 10 | 5 | 15 |
| VV | 70 | 5 | 5 | 5 | 15 |
| WW | 70 | 5 | 8 | 12 | 5 |
| XX | 75 | 0 | 5 | 10 | 10 |
| YY | 75 | 5 | 5 | 5 | 10 |
| ZZ | 80 | 5 | 5 | 5 | 5 |

Methods of producing a flexible feedstock material are also disclosed. The methods may comprise combining one or more of the components of the flexible feedstock composition into a feedstock material. The feedstock material may be in the form of a liquid or semi-solid (e.g., flowable solid) for injection molding. The feedstock material may be in the form of a flexible solid. Thus, in some embodiments, the method may comprise forming the feedstock material into a desired solid body. The method may comprise, for example, extruding the feedstock material into a filament. In other embodiments, the method may comprise extruding the feedstock material into a pellet, a disk, or a sheet.

One method of producing a flexible feedstock material comprises melt mixing one or more components of the feedstock composition together. The components may be melt-mixed. The temperature of the mixer may be above the melting temperature of a polymer component of the mixture. The temperature of the mixer may be less than the decomposition temperature of a polymer component of the mixture. The mixing may be performed in a heated mixing device which includes one or more of an extruder, a heated high shear mixer, a heated double planetary mixer, and a sigma-mixer. Multiple mixers may be used. The process may be performed under vacuum. In general, the process may be performed with inert equipment and/or in an inert environment. The order of component addition may be controlled to provide a desired result. For instance, in one exemplary embodiment, the polymers may be melted, followed by the petrolatum phase, followed by the powder. The powder may be premixed with a compatibilizer. In general, the feedstock composition components may be mixed to provide a substantially homogeneous feedstock material.

In some embodiments, various of the components of the flexible feedstock composition may react (e.g., crosslink) during production of the filament. For instance, maleic anhydride can react with other polymers and/or metal surfaces to form stronger bonds. Alternatively, peroxides can exhibit a similar reaction. As a result, a component may occasionally be composed of a mixture of soluble and insoluble parts.

To make a solid body, e.g., a filament, the mixed material may be extruded. The material may be extruded, for example, by processing through one or more of a single screw extruder, a twin screw extruder, or a push bore device (e.g., a capillary rheometer, or a die press). Control of filament parameters such as diameter, roughness, density, viscosity, crystallinity, etc. may be performed. In general, the extrusion method may be selected to provide a desired filament diameter, roughness, density, viscosity, and/or crystallinity.

The filament may be wound or spooled for use in 3D printing devices, as previously described.

Certain petrolatum compositions have a paste-like consistency which can make extrusion processing under conventional methods more challenging. Methods of producing a flexible feedstock filament may comprise heating the petrolatum, for example, to a liquid consistency, for incorporation into the feedstock composition. Alternatively or additionally, methods may comprise premixing the petrolatum with other components of the composition. For instance, the petrolatum may be premixed with one or more of a metal or ceramic powder, a soluble brown part porosity maker, a non-soluble backbone component, and an additive. The petrolatum may be premixed with one or more of a compatibilizer, a tackifier, an antioxidant, and a rheology modifier. The petrolatum may be premixed with a binder. The premixture may then be incorporated with other components of the feedstock composition, for example, by melt mixing. In other embodiments, one or more components may be cooled down to a solid consistency for mixing with the petrolatum. The petrolatum may additionally be cooled to a solid composition. The solid mixture may be provided for feeding into an extruder.

Figure 5:
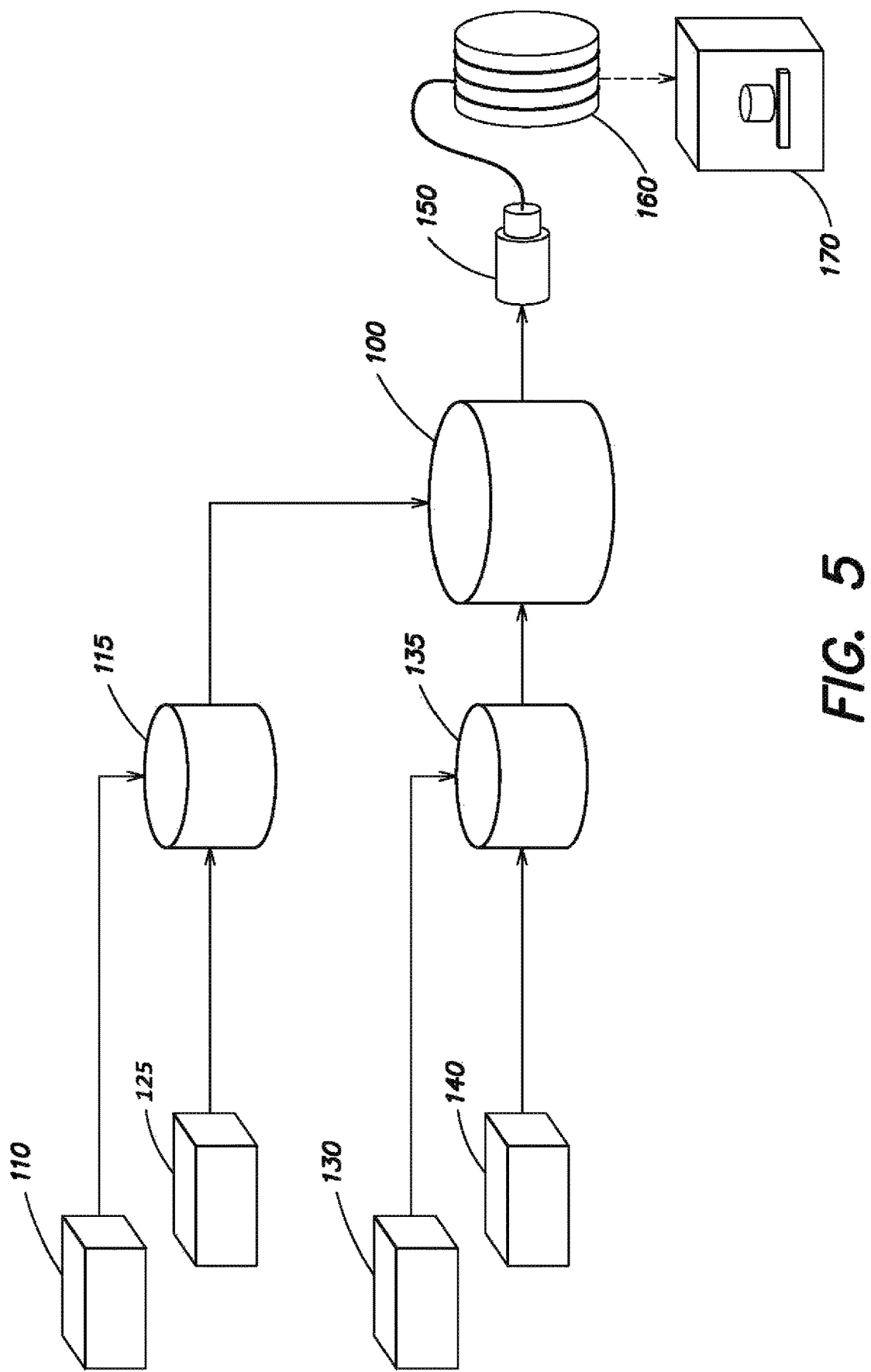
FIG. 5 is a schematic representation showing a system and method for producing a flexible feedstock material in accordance with one embodiment.

As shown in FIG. 5 a flexible feedstock material may be produced by melt-mixing components of the material, for example, in a mixer 100 set at a predetermined melt mixing temperature. For instance, one or more of metal or ceramic powder 110, a compatibilizer 125, a flexibilizer 130, and a binder 140 may be combined in a mixer 100. The combination may be formed into a solid body, for example, through an extruder 150. The extruded solid body may be mounted on a carrier, for example, a spool 160. The spool 160 may be loaded in a device for producing the 3D printed part, for example, a fused deposition modeling 3D printer 170. In certain embodiments, as shown in FIG. 5, the flexibilizer 130 and the binder 140 may be combined to form a premixture, for example, in a mixer 135. In certain embodiments, as also shown in FIG. 5, the metal or ceramic powder 110 and the compatibilizer 125 may be combined to form a premixture, for example, in a mixer 115. Each of mixer 115 and 135 may be set to a predetermined temperature. The predetermined temperature may be heating or cooling, as previously described. One or more premixture may be combined in mixer 100 to form melt mixture.

Green and brown state parts, including the disclosed flexible feedstock, may be deformed. The degree of flexibility can be tuned through the selection of polymer. For instance, HDPE is generally stiffer than LLDPE. The degree of flexibility can be tuned through the selection of an amount of petrolatum content in the composition. In general, less petrolatum content provides a lesser flexible material. Generally, adding more crystalline materials will produce a stiffer green and/or brown part. The feedstock material disclosed herein may be sufficiently flexible to be used at room temperature. Thus, the feedstock material disclosed herein may comprise an amount of petrolatum sufficient to produce a feedstock material that is flexible at room temperature.

Example: Preparation of Flexible Feedstock Material

The embodiments may be further understood with reference to the following example. The example is intended to serve as an illustration and is not limiting.

Various feedstocks have been prepared and experimentally tested. The feedstocks were subjected to a test method to determine flexibility. The test method included creating a flexural strength test specimen with thickness near an expected filament diameter. For instance, a 2 mm×25 mm×40 mm plate sample can be prepared and measured using a 3 point bend setup with 30 mm support span. The prepared samples were tested in an Instron type device to create a stress-strain curve. Modulus, strength, and strain at break for each sample were determined. The test sample compositions are identified in Tables 3A-3B. The strain at break results are presented in Table 4.

TABLE 3A

Test Sample Compositions

| ID | Metal or Ceramic Powder (vol %) | Compatibilizer (vol %) | Flexible Solubilizer (vol %) | Non-soluble binder (vol %) |
|---|---|---|---|---|
| MF 8 | 60 (stainless steel) | 0 | 20 (Petrolatum) | 20 (LLDPE) |
| MF 13 | 60 (stainless steel) | 0 | 20 (Petrolatum) | 20 (Ethylene and methyl acrylate copolymer: LLDPE mix) |

TABLE 3B

Test Sample Compositions

| ID | Metal or Ceramic Powder (vol %) | Compatibilizer (vol %) | Non-soluble Binder (vol %) | Soluble Polymeric Binder (vol %) | Soluble Tackifier (vol %) |
|---|---|---|---|---|---|
| MF11 | 60 | 0 | 12 (LLDPE) | 12 (Ethylene-vinyl acetate copolymer) | 16 (hydrocarbon resin) |

TABLE 4

Strain at Break of Tested Feedstock Samples

| ID | Sample | Strain at Break (%, @ ~60 vol % metal powder) | Strain at Break (%, @ ~45 vol % metal powder) |
|---|---|---|---|
| MF1 | Commercial Feedstock | 0.7 | N/A |
| MF2 | Paraffin - HDPE based feedstock | — | 0.7 |
| MF3 | Paraffin - LLDPE based feedstock | — | 1.3 |
| MF4 | Microcrystalline wax - LLDPE based feedstock | 1.2 | 5.2 |
| MF5 | Paraffin/Mineral Oil - LLDPE based feedstock | 0.8 | 4.4 |
| MF6 | LLDPE only feedstock (thermal debind necessary) | — | 12.6 |
| MF7 | Feedstock with soluble elastomer | 2.2 | 3.8 |
| MF8 | Petrolatum - LLDPE based feedstock | Does not break (>25) | — |
| MF9 | Petrolatum - LLDPE/HDPE based feedstock | 5.9 | — |
| MF10 | Petrolatum - HDPE based feedstock | 1.0 | — |
| MF11 | Soluble Polymeric Binder and Tackifier - LLDPE based feedstock | Does not break (>25) | — |
| MF 12 | Petrolatum - PP - elastomer-based feedstock | 6.5 | — |
| MF 13 | Petrolatum - elastomer-based feedstock | Does not break (>25) | — |
| MF 14 | Petrolatum - PP - copolymer-based feedstock | 1.4 | — |

Images of the tested feedstock samples are included in FIGS. 6A, 6B, 7A, and 7B.

Figure 6A:
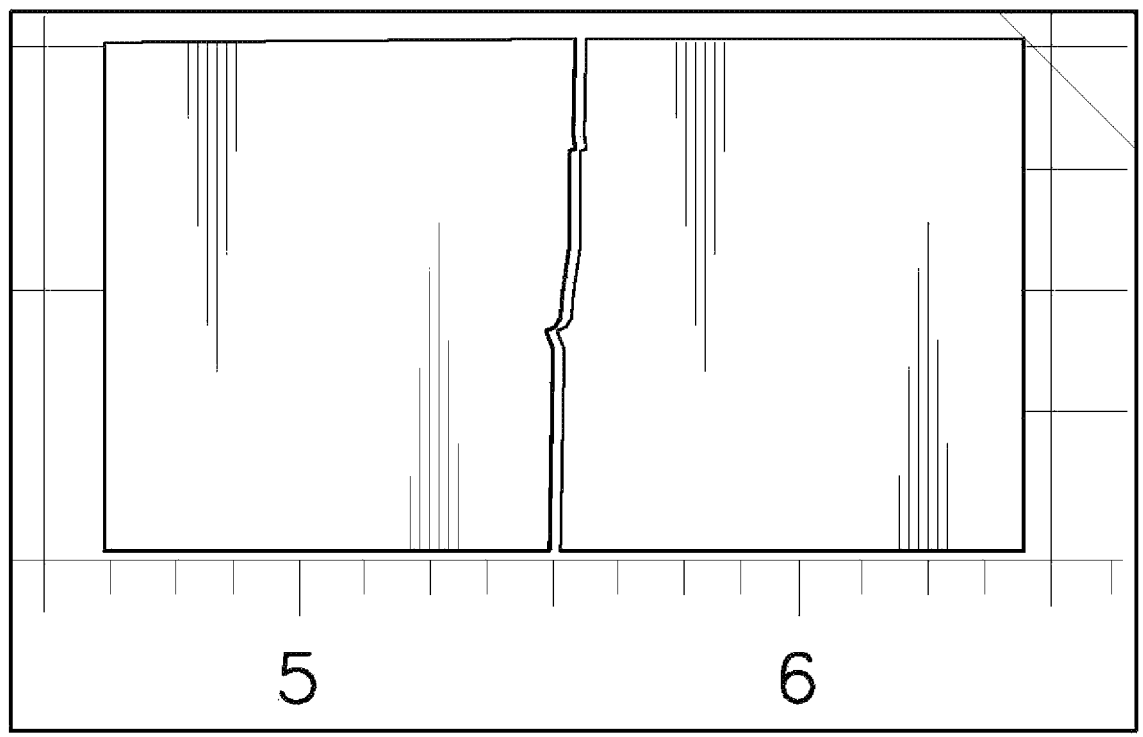

MF1-MF6 type feedstocks are shown in FIGS. 6A and 6B. MF1-MF6 type feedstock was brittle and cracked when the samples were bent. FIG. 6A shows a crack in one of the MF1-MF6 type samples which occurred near a 1% strain in a flexural setup. FIG. 6B shows cracks that formed as an MF1-MF6 type sample was pushed through a jig at a 4.75 cm inner radius.

Figure 7A:
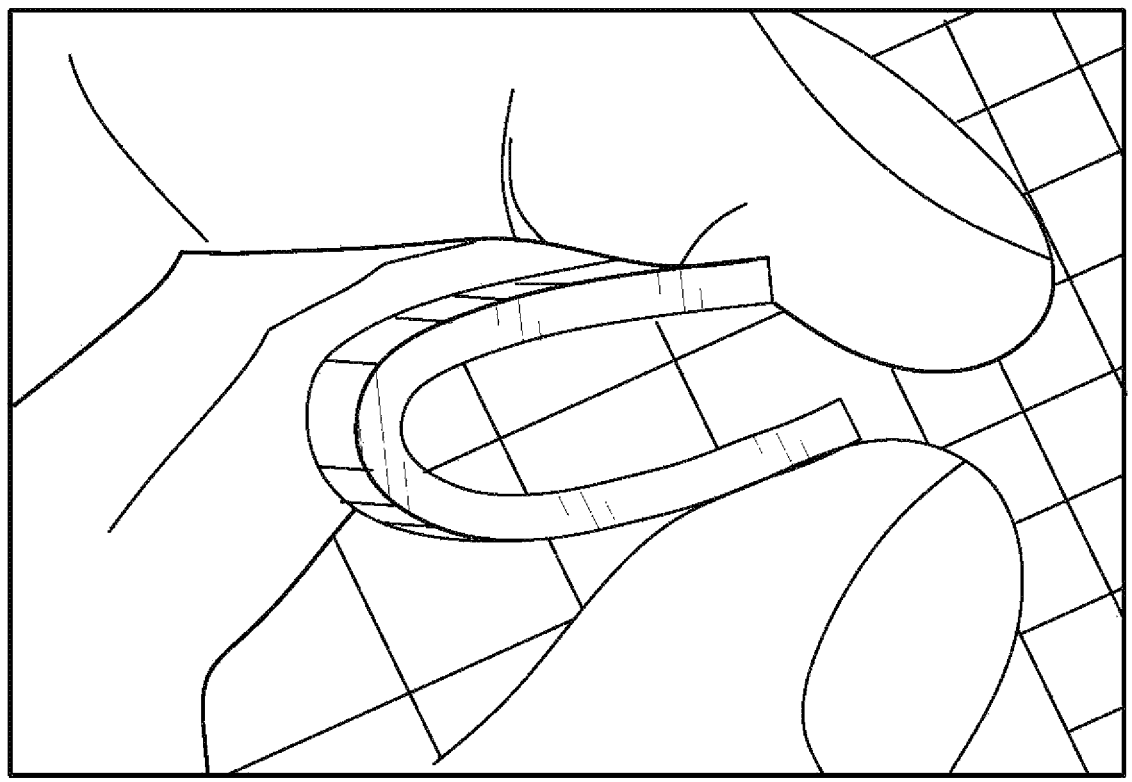
FIG. 7A illustrates a feedstock material in accordance with one embodiment.
Figure 7B:
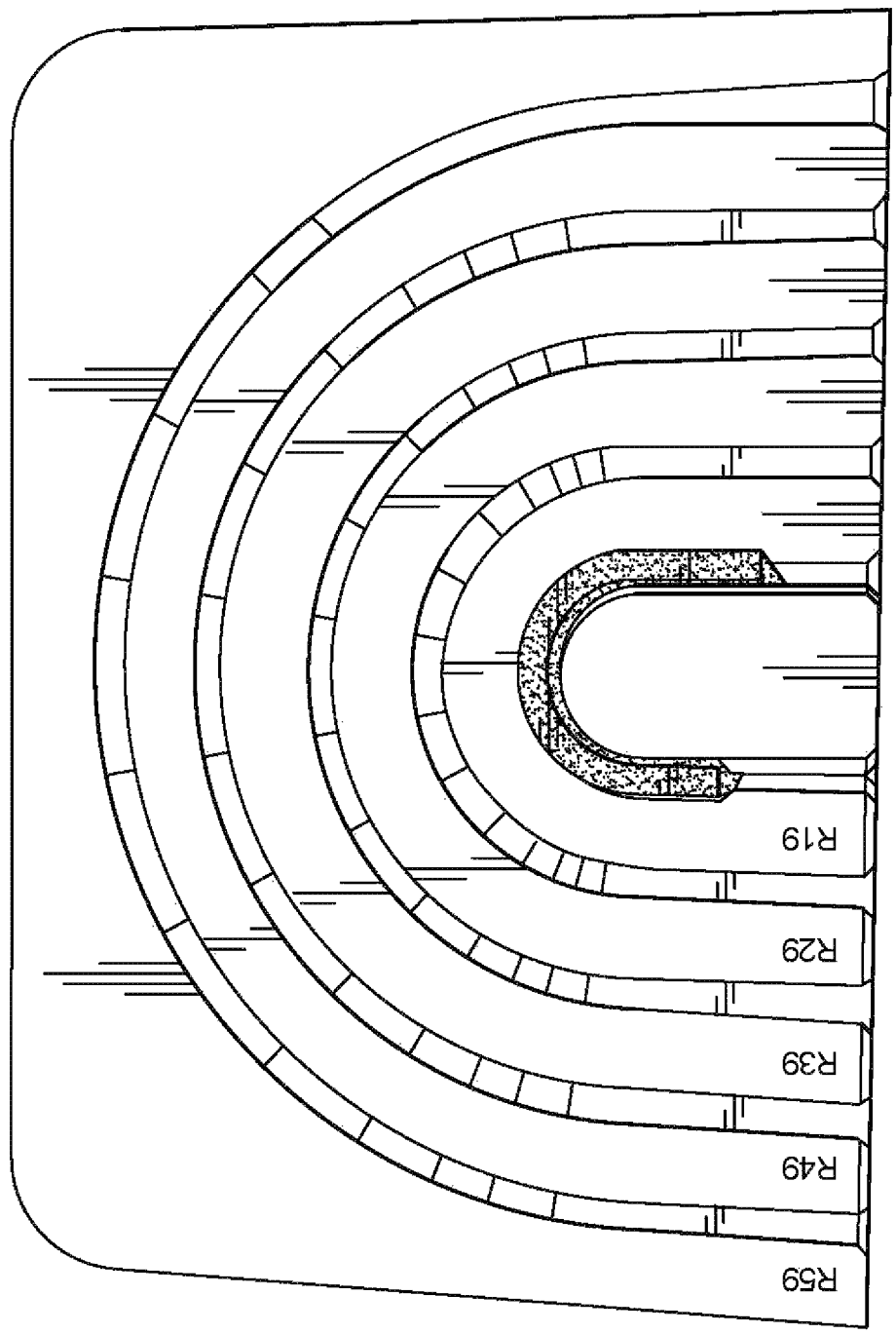
FIG. 7B illustrates a feedstock material in accordance with one embodiment.

MF8 feedstock was subjected to the same tests described above with reference to the MF1-MF6 type feedstocks and is shown in FIGS. 7A and 7B. MF8 feedstock which included petrolatum is more flexible than the MF1-MF6 type feedstocks. FIG. 7A shows that the MF8 sample can be bent onto itself while maintaining structural integrity. Failure of structural integrity can include, for example, cracking, fracturing, or otherwise breaking. FIG. 7B shows that the MF8 sample can be pressed through a jig at a 0.75 cm inner radius while maintaining structural integrity.

Thus, the feedstock samples including petrolatum as a flexibilizer showed increased flexibility over the feedstock samples lacking petrolatum. The feedstock samples including petrolatum may maintain structural integrity after being bent at room temperature. Other compositions disclosed herein are expected to provide similar performance results.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A flexible 3D printing feedstock material comprising: 60-75 vol % of a metal powder, 0-5 vol % of a compatibilizer, 10-35 vol % of a soluble component consisting of petrolatum, and 5-30 vol % of a backbone component comprising a non-soluble component, the material formulated to exhibit a flexural strain of greater than 3% while substantially maintaining structural integrity during feeding to a print head between 20° C. and 27° C.

2. The material of claim 1, having 15-25 vol % of the petrolatum as the soluble component.

3. The material of claim 1, wherein particles of the metal powder have a median size of less than 50 μm.

4. The material of claim 1, wherein the compatibilizer comprises stearic acid.

5. The material of claim 1, wherein the non-soluble component comprises linear-low density polyethylene (LLDPE).

6. The material of claim 1, wherein the non-soluble component comprises at least one of high-density polyethylene (HDPE) and polypropylene (PP).

7. The material of claim 1, formulated to exhibit a flexural strain of greater than 10% while substantially maintaining structural integrity during feeding to a print head between 20° C. and 27° C.

8. The material of claim 7, formulated to exhibit a flexural strain of greater than 25% while substantially maintaining structural integrity during feeding to a print head between 20° C. and 27° C.

9. A method of producing a 3D printed part, the method comprising operating a fused deposition modeling 3D printer loaded with a filament formed of the material of claim 1 to print the 3D printed part.

10. A method of forming a flexible 3D printing feedstock material, the method comprising melt mixing components including 60-75 vol % of a metal powder, 0-5 vol % of a compatibilizer, 10-35 vol % of a soluble component consisting of petrolatum, and 5-30 vol % of a backbone component comprising a non-soluble component, and formulating the material to exhibit a flexural strain of greater than 3% while substantially maintaining structural integrity during feeding to a print head between 20° C. and 27° C.

11. The method of claim 10, wherein melt mixing the components is performed under vacuum.

12. The method of claim 10, wherein melt mixing the components comprises:
melting the non-soluble component
combining the petrolatum and the melted non-soluble component to form a first premixture; and
combining the metal powder and the compatibilizer with the first premixture to form a melt mixture.

13. The method of claim 12, further comprising combining the metal powder and the compatibilizer to form a second premixture and combining the first premixture and the second premixture to form the melt mixture.

14. The method of claim 10, further comprising forming the material into a filament by extrusion.

15. The method of claim 14, further comprising producing a 3D printed part by operating a fused deposition modeling 3D printer with the filament to print the 3D printed part.

16. A flexible 3D printing feedstock material comprising:
60-75 vol % of a metal powder, 0-5 vol % of a compatibilizer, 5-25 vol % of a non-soluble binder, 5-20 vol % of a soluble component, and 5-25 vol % of a hydrocarbon resin as a soluble tackifier, the material formulated to exhibit a flexural strain of greater than 3% while substantially maintaining structural integrity during feeding to a print head between 20° C. and 27° C.

17. The material of claim 16, comprising:
60-66 vol % of the metal powder, 10-14 vol % LLDPE as the non-soluble binder, 10-14 vol % ethylene-vinyl acetate copolymer as the soluble component, 12-18 vol % of a low molecular weight hydrocarbon resin as the soluble tackifier, and 0-2% of the compatibilizer.

18. A flexible 3D printing feedstock material comprising:
60-75 vol % of a ceramic powder, 0-5 vol % of a compatibilizer, 10-35 vol % of a soluble component consisting of petrolatum, and 5-30 vol % of a backbone component comprising a non-soluble component, the material formulated to exhibit a flexural strain of greater than 3% while substantially maintaining structural integrity during feeding to a print head between 20° C. and 27° C.

19. The material of claim 18, having 15-25 vol % of the petrolatum as the soluble component.

20. The material of claim 18, wherein particles of the ceramic powder have a median size of less than 50 μm.

21. The material of claim 18, wherein the compatibilizer comprises stearic acid.

22. The material of claim 18, wherein the non-soluble component comprises linear-low density polyethylene (LLDPE).

23. The material of claim 18, wherein the non-soluble component comprises at least one of high-density polyethylene (HDPE) and polypropylene (PP).

24. A method of producing a 3D printed part, the method comprising operating a fused deposition modeling 3D printer loaded with a filament formed of the material of claim 18 to print the 3D printed part.

25. A method of forming a flexible 3D printing feedstock material, the method comprising melt mixing components including 60-75 vol % of a ceramic powder, 0-5 vol % of a compatibilizer, 10-35 vol % of a soluble component consisting of petrolatum, and 5-30 vol % of a backbone component comprising a non-soluble component, the material formulated to exhibit a flexural strain of greater than 3% while substantially maintaining structural integrity during feeding to a print head between 20° C. and 27° C.

26. The method of claim 25, wherein melt mixing the components is performed under vacuum.

27. The method of claim 25, wherein melt mixing the components comprises:
melting the non-soluble component;
combining the petrolatum and the melted non-soluble component to form a first premixture; and
combining the ceramic powder and the compatibilizer with the first premixture to form a melt mixture.

28. The method of claim 27, further comprising combining the ceramic powder and the compatibilizer to form a second premixture and combining the first premixture and the second premixture to form the melt mixture.

29. The method of claim 25, further comprising forming the material into a filament by extrusion.

30. The method of claim 29, further comprising producing a 3D printed part by operating a fused deposition modeling 3D printer with the filament to print the 3D printed part.

31. A flexible 3D printing feedstock material comprising:
60-75 vol % of a ceramic powder, 0-5 vol % of a compatibilizer, 5-25 vol % of a non-soluble, 5-20 vol % of a soluble component, and 5-25 vol % of a hydrocarbon resin as a soluble tackifier, the material formulated to exhibit a flexural strain of greater than 3% while substantially maintaining structural integrity during feeding to a print head between 20° C. and 27° C.

32. The material of claim 31, comprising:
60-66 vol % of the ceramic powder, 10-14 vol % LLDPE as the non-soluble binder, 10-14 vol % ethylene-vinyl acetate copolymer as the soluble component, 12-18 vol % of a low molecular weight hydrocarbon resin as the soluble tackifier, and 0-2% of the compatibilizer.

33. The material of claim 5, wherein the backbone component is substantially free of high-density polyethylene (HDPE) and polypropylene (PP).

34. The material of claim 5, wherein the non-soluble component further comprises an ethylene and methyl acrylate copolymer.

35. The material of claim 16, wherein the non-soluble binder comprises LLDPE and is substantially free of high-density polyethylene (HDPE) and polypropylene (PP).

36. The material of claim 35, wherein the non-soluble binder further comprises an ethylene and methyl acrylate copolymer.

37. The material of claim 16, wherein the soluble component is a soluble polymeric binder.

38. The material of claim 16, wherein the soluble component is a soluble flexibilizer consisting of petrolatum.

39. The material of claim 22, wherein the backbone component is substantially free of high-density polyethylene (HDPE) and polypropylene (PP).

40. The material of claim 22, wherein the non-soluble component further comprises an ethylene and methyl acrylate copolymer.

41. The material of claim 31, wherein the non-soluble comprises LLDPE and is substantially free of high-density polyethylene (HDPE) and polypropylene (PP).

42. The material of claim 41, wherein the non-soluble binder further comprises an ethylene and methyl acrylate copolymer.

43. The material of claim 31, wherein the soluble component is a soluble polymeric binder.

44. The material of claim 31, wherein the soluble component is a soluble flexibilizer consisting of petrolatum.

\* \* \* \* \*